G. A. JOHNSON.
FRICTION GEAR.
APPLICATION FILED DEC. 16, 1916.
1,255,171.
Patented Feb. 5, 1918.
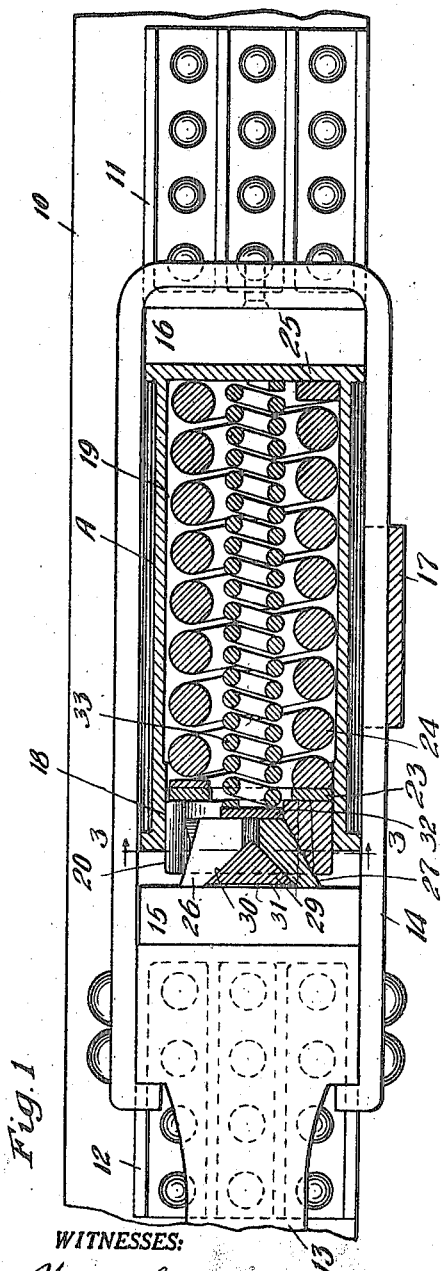
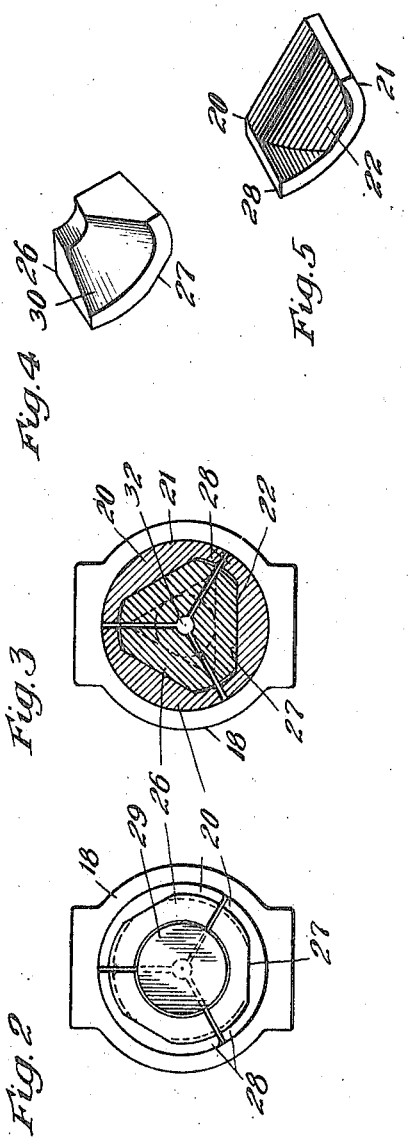
WITNESSES:
INVENTOR.
George A. Johnson

UNITED STATES PATENT OFFICE.

GEORGE A. JOHNSON, OF CHICAGO, ILLINOIS, ASSIGNOR TO WILLIAM H. MINER, OF CHAZY, NEW YORK.

FRICTION-GEAR.

1,255,171.  Specification of Letters Patent.  Patented Feb. 5, 1918.

Application filed December 16, 1916. Serial No. 137,359.

*To all whom it may concern:*

Be it known that I, GEORGE A. JOHNSON, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

One object of the invention is to provide a relatively cheap and efficient gear having high capacity with certain release.

Another object of the invention is to provide a friction gear wherein is employed a true, collapsible wedge, as distinguished from so-called differential or combined multiple part main and auxiliary wedges.

Another and more specific object of the invention is to provide a collapsible wedge wherein are employed a series of wedges corresponding to the number of friction shoes and a non-wedging plug mounted between the wedges for the purpose of maintaining the latter in their fully expanded or operative position during the act of compression, the plug being so designed as to be readily releasable upon removal of the pressure, to thereby permit the wedges to collapse and relieve the pressure against the shoes.

In the drawing forming a part of this specification, Figure 1 is a longitudinal, sectional view of a draft rigging showing my improvements in connection therewith, some parts being shown in side elevation. Fig. 2 is a front end elevation of the improved gear. Fig. 3 is a vertical, sectional view showing more particularly the friction elements and taken on the line 3—3 of Fig. 1. And Figs. 4 and 5 are detail perspectives of one of the wedges and one of the friction shoes, respectively.

In said drawing, 10 indicates one of the draft sills of a car, 11 a rear stop, 12 a front stop, 13 a draw bar, 14 a yoke secured to the draw bar, 15 a front follower, 16 a rear follower, and 17 a saddle plate for holding the parts in position. All of the foregoing may be of well known or standard construction.

The improved gear proper, as shown, comprises a combined friction shell and spring casing designated generally by the reference A, the same having a cylindrical friction shell proper 18 at the front end and a spring casing 19 at the rear of the friction shell. Coöperable with the member A is a circularly arranged set of friction shoes 20—20, each of the shoes 20 having an outer cylindrical surface 21 coöperable with the interior friction surface of the shell 18. On its inner face, each friction shoe 20 is provided with a wedging surface 22 which may be made relatively acute, in view of the collapsible wedge hereinafter described. The shoes 20, at their rear or inner ends bear against a washer 23 against which bears the outer end of the heavy coil 24 of the spring of the gear, the rear end of said coil 24 bearing against the integral rear wall 25 of the member A. Mounted within the friction shoes 20 is a "collapsible wedge," the same comprising a series of wedge elements 26 equaling in number the number of friction shoes. Each of the wedge elements 26 is provided with an exterior wedge surface 27 corresponding to and engaging the opposed wedging surface 22 of the friction shoe. As clearly appears from Fig. 3, the wedge elements 26 are seated within the shoes and prevented from circumferential displacement with respect thereto by means of the sections 28—28 of the shoes. As clearly indicated in Fig. 1, the wedge elements 26 bear directly against the front follower 15 and in order to prevent the wedge from collapsing during action of the gear and to maintain the collapsible wedge in fully expanded operative position, I have provided a loose plug 29 which is of conical form and has its surface contacting the corresponding conical surfaces 30 on the inner faces of the wedge elements 26.

In the drawing, a relatively slight clearance is indicated between the outer face 31 of the plug and the inner face of the front follower, but this amount of clearance is greatly exaggerated in the drawing in order to prevent possible misconception as to the action of the plug 29. In actual practice, said outer face 31 will be made flush with the outer ends of the wedge elements 26 so far as possible, but in order to prevent any possibility of the face 31 projecting beyond the outer ends of the wedge elements 26 and thereby creating a wedging action between the plug 29 and said wedge elements, said plug will be cast slightly shorter to compensate for any foundry variations and insure being on the safe side to prevent wedging action. The function of the plug 29, under compressive movements, is merely to hold the wedge elements in fully expanded position for the purpose hereinafter described. It will be noted that the angle of contact between the conical surface of the plug 29 and the surfaces 30 of the wedge elements is relatively blunt. At their inner ends, the wedge elements 26 bear against a washer 32 which fits within the inner ends of the friction shoes and the inner coil 33 of the spring of the gear bears against said washer 32 at its front end, the rear end of said coil 33 bearing against said wall 25.

In operation, upon inward movement of the draw bar, it is apparent that pressure will be transmitted through the follower 15 directly to the wedge elements 26. The latter, which form the "collapsible wedge," are prevented from collapsing by the plug 29 and on account of the relatively acute angle between the wedging faces of the collapsible wedge and friction shoes, a greatly multiplied pressure is transferred to the friction shoes and from the friction shoes to the friction shell. It is obvious that the inward movement of the friction shoes is resisted by the outer coil of the spring and the collapsible wedge is resisted by the inner coil of the spring. With this arrangement, a large capacity is obtained due to the acute angle between the wedge and the shoes. Upon removal of the pressure, that is, during release, the loose plug 29 will disengage itself freely from the elements of the collapsible wedge since there is no wedging action between said plug and the wedge. This permits the wedge to collapse, which action is assisted by the inner coil 33 and thus relieves the pressure against the friction shoes and insures a satisfactory release.

Heretofore, where an acute angle has been employed between a wedging element and the friction shoes, while it has been possible to obtain high capacity, such gears did not readily release, but "stuck" when any heavy blow was imposed thereon. When a blunt angle has heretofore been used between a wedging element and the friction shoes, it was possible to obtain the release, but the capacity remained low. With my arrangement, I am enabled to employ the acute angle between the wedge and the friction shoes and because of the loose plug, which is not wedged against the wedging elements 26, a certain and easy release is obtained, thus providing a friction gear that is relatively cheap to manufacture and possessing the advantages of more expensive friction gears having various expedients to insure release.

Although I have herein shown and described what I now consider the preferred embodiment of the invention, the same is merely illustrative and I contemplate all changes and modifications that come within the scope of the claims appended hereto.

I claim:

1. In a friction gear, the combination with a friction shell, of friction shoes coöperable therewith and having interior wedge faces, a plurality of wedge elements coöperable with said shoes, and loose means within said wedge elements for maintaining the latter in expanded, operative condition during compressive action of the gear, said elements and said means acting substantially as a solid unit to wedge the shoes outwardly, said means upon release action being free to move independently of said elements and thereby permit collapse of said elements.

2. In a frictional shock absorbing mechanism, the combination with a friction shell, of a plurality of friction shoes coöperative therewith and having wedge surfaces on their inner faces, resilient means for resisting movement of the shoes with respect to the shell, and a plurality of members located centrally of said shoes and adapted to act as a solid wedge in coöperation with said shoes under compressive action of the gear, one of said members being free to move independently of the other members during release and permit collapse thereof.

3. In a friction gear, the combination with a friction shell, of friction shoes coöperable with said shell, a collapsible wedge, a follower located adjacent said wedge, the parts being so arranged that pressure is transmitted directly from the follower to the wedge in lines parallel to the axis of the gear, and means associated with the wedge for retaining the latter in operative expanded condition when pressure is so transmitted, said means having movement independently of said wedge during release and after removal of pressure to thereby permit the wedge to collapse.

4. In a friction gear, the combination with a friction shell, of friction shoes coöperable with said shell and having interior wedge faces at an acute angle to the axis of the shell, a spring for resisting movement of said shoes, wedge elements coöperable with and corresponding in number to said friction shoes, and a non-wedge-acting plug located within the wedge elements, the parts being so arranged that pressure is transmitted to the wedge elements in lines parallel to the axis, then from the wedge elements through the coacting wedge faces to the shoes at an acute angle to the axis of the shell and finally from the shoes radially to the friction shell, said plug and wedge elements acting as a unitary wedge in compressive action and the plug being readily releasable with respect to said elements under release.

5. In a frictional shock absorbing mechanism of the character described, the combination with a friction shell having friction surfaces on its interior, of a plurality of friction shoes having friction surfaces on their outer faces coöperable with the friction surfaces of the shell, each of said shoes being provided on its inner face with a wedging surface at an acute angle to the axis of the shell, spring means for resisting relative movement between the shoes and shell, a plurality of wedge elements disposed within the shoes and having outer wedge surfaces coöperable with the wedge surfaces of the shoes, said wedge elements having inclined surfaces on their inner faces and at a blunter angle to the axis of the shell than the wedge surfaces of the shoes, and a plug fitting within the wedge elements and having its outer end surface substantially flush with the outer ends of the wedge elements whereby, said elements and plug act substantially as a solid wedge during compressive action of the mechanism and thereby a high frictional capacity is produced because of the acute angle between the wedge elements and shoes, and the plug is movable independently of the wedge elements under release to permit collapse of said elements and disengagement from the shoes.

In witness that I claim the foregoing I have hereunto subscribed my name this 14th day of December, 1916.

GEORGE A. JOHNSON.